United States Patent
Sugimoto et al.

(10) Patent No.: US 6,653,376 B2
(45) Date of Patent: Nov. 25, 2003

(54) WATER-AND-OIL REPELLANT COMPOSITION OF AQUEOUS DISPERSION TYPE AND PROCESS FOR PRODUCING THE SAME

(75) Inventors: Shuichiro Sugimoto, Yokohama (JP); Kyouichi Kaneko, Yokohama (JP); Takashige Maekawa, Yokohama (JP); Minako Shindo, Yokohama (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/463,227

(22) PCT Filed: Apr. 26, 1999

(86) PCT No.: PCT/JP99/02211

§ 371 (c)(1),
(2), (4) Date: Jan. 21, 2000

(87) PCT Pub. No.: WO99/60071

PCT Pub. Date: Nov. 25, 1999

(65) Prior Publication Data

US 2003/0153664 A1 Aug. 14, 2003

(30) Foreign Application Priority Data

May 21, 1998 (JP) .......................................... 10-140076
Sep. 29, 1998 (JP) .......................................... 10-275994
Feb. 24, 1999 (JP) ............................................. 11-47038

(51) Int. Cl.$^7$ ................................................ C08K 5/42
(52) U.S. Cl. ........................ 524/156; 524/221; 524/224; 524/220; 524/157; 524/158; 524/101; 524/166; 524/380; 524/386; 524/388; 524/370; 524/372

(58) Field of Search ................................. 524/380, 386, 524/388, 220, 221, 224, 156, 157, 158, 161, 166, 370, 372

(56) References Cited

U.S. PATENT DOCUMENTS 5,714,082 A * 2/1998 Boardman et al. .......... 252/8.62

FOREIGN PATENT DOCUMENTS

| EP | 1 000 996 | 5/2000 |
|----|-----------|--------|
| EP | 1 004 701 | 5/2000 |
| JP | 58-103575 | 6/1983 |
| JP | 6-33043 | 2/1994 |
| JP | 7-238471 | 9/1995 |

OTHER PUBLICATIONS

1997:88759 HCAPLUS "Aqueous compositions containing fluorocarbon group–containing polymers and surfactants for improved antisoiling properties and fibrous substrates treated therewith" Boardman et al., Dec. 5, 1996.*

* cited by examiner

Primary Examiner—Peter D. Mulcahy
(74) Attorney, Agent, or Firm—Oblon, Spivak, McClelland, Maier & Neustadt, P.C.

(57) ABSTRACT

A water dispersion type water and oil repellent composition which is capable of imparting durable water resistance to clothing for which high water and oil repellency is required and which is capable of imparting high oil repellency to paper. The water dispersion type water and oil repellent composition comprises 1) an aqueous medium, 2) a polymer of a monomer having a polyfluoroalkyl group and one polymerizable unsaturated group and 3) a mono(or poly)ol or an alkylene oxide thereof, as essential components.

8 Claims, No Drawings

WATER-AND-OIL REPELLANT COMPOSITION OF AQUEOUS DISPERSION TYPE AND PROCESS FOR PRODUCING THE SAME

BACKGROUND OF THE INVENTION

Technical Field

The present invention relates to a water dispersion type water and oil repellent composition which is capable of imparting durability excellent in water and oil repellency and water resistance against washing, abrasion, etc. of clothing, etc., and a method for its production. Further, it relates to a water dispersion type water and oil repellent composition excellent in water and oil repellency performance in various papers, and a method for its production.

Heretofore, a technique has been known to treat e.g. a fiber product with a polymer having polymer units of an addition polymerizable monomer containing a polyfluoroalkyl group (hereinafter referred to as a $R^f$ group) or a compound having a $R^f$ group in the form of an organic solvent solution or an aqueous solvent dispersion to impart water and oil repellency to its surface. The addition polymerizable monomer will hereinafter be referred to simply as a monomer.

Improvement of the water and oil repellency has been accomplished to some extent by forming a copolymer by employing a monomer having a bonding group together with a monomer having a $R^f$ group, by blending a polymer having $R^f$ groups with a polymer having a high coating film strength, or by modifying the polymerization method, for the purpose of improving the durability against washing, abrasion, etc.

A method of coating a polyurethane resin or an acrylic resin is known in order to improve the durability of water resistance as higher water and oil repellency, but there has been a problem that the hand and feel of the fabric tend to be hard. Further, a method is also known to apply water repellency treatment to a high a density fabric employing extremely fine fibers to improve the water resistance, but no adequate water resistance has been obtained with conventional water dispersion type water and oil repellent treating agents.

Further, a method is also known wherein a fabric once treated with a water and oil repellent, is further treated with a water and oil repellent of a solvent type, but the treating process is cumbersome, and there has been a problem such as environmental pollution by the organic solvent.

On the other hand, as a water and oil repellent for paper, a phosphoric acid ester having a perfluoroalkyl group or the like is known. However, for the treatment by a post treating method wherein a treating agent is impregnated or coated on base paper, a sizing press or a coater is employed, and treatment is carried out at a high speed, whereby there has been a problem that with a conventional water and oil repellent, inadequate oil repellency tends to result frequently.

With conventional water and oil repellent compositions and water and oil repellent treatments, the durability of water resistance has been inadequate, although the durability against washing, abrasion, etc. of the water and oil repellency imparted to common clothing, has been at a satisfactory level.

Especially when fibers, etc., having a special surface shape, employing very fine high density synthetic fibers, new synthetic fibers (a general term for fabrics employing very fine fibers or processed yarns (such as split yarns), for example "relanche", trade name, manufactured by Toray Corporation), etc., are treated for water and oil repellency, there has been a practical problem that the water and oil repellency or the water resistance tends to be remarkably decreased by abrasion during wearing and by washing a few times.

Further, the method by coating or the like of a resin, has had a problem of hardening of the hand and feel. On the other hand, the application to paper has had a problem of inadequate oil repellency depending upon the treating method.

An object of the present invention is to provide a water dispersion type water and oil repellent composition which has excellent water resistance against washing, abrasion, etc. and durability of practical water and oil repellency whereby there will be little hardening of the hand and feel, and to provide a water dispersion type water and oil repellent composition for paper, whereby excellent oil repellency can be obtained constantly. A further object is to provide a water dispersion type water and oil repellent composition which can be applied to an article such as a metal, glass or a resin, for which water and oil repellency is required.

DISCLOSURE OF THE INVENTION

The present invention is a water dispersion type In water and oil repellent composition comprising an aqueous medium, the following Polymer A and the following Compound B, as essential components:

Polymer A: a polymer comprising polymer units a of a monomer having a polyfluoroalkyl group and one polymerizable unsaturated group, Compound B: a monool or polyol having an unsaturated triple bond, or an alkylene oxide adduct thereof.

BEST MODE FOR CARRYING OUT THE INVENTION

Polymer A is a polymer comprising polymer units of a monomer having a $R^f$ group and only one polymerizable unsaturated group (hereinafter referred to as a $R^f$ group containing monomer).

The $R^f$ group is a group having at least two hydrogen atoms in an alkyl group substituted by fluorine atoms. The carbon number of the $R^f$ group is preferably from 4 to 20, more preferably from 6 to 16, particularly preferably from 9 to 12. The $R^f$ group may be of a straight chain structure or a branched structure. In the case of a branched structure, it is preferred that the branched moiety is present in the vicinity of a terminal of the $R^f$ group, and the branched moiety is of a short chain with a carbon number of from about 1 to 4. Further, the $R^f$ group may have an etheric oxygen atom inserted between a carbon-carbon bond. The $R^f$ group may contain a halogen atom other than a fluorine atom, and a chlorine atom is preferred as the halogen atom other than a fluorine atom.

The number of fluorine atoms in the $R^f$ group is preferably at least 60%, particularly preferably at least 80%, when it is represented by [(number of fluorine atoms in the $R^f$ group)/(number of hydrogen atoms contained in an alkyl group having the same carbon number as in the $R^f$ group)]×100 (%). Further, the $R^f$ group is preferably a group having all hydrogen atoms in an alkyl group substituted by fluorine atoms, i.e. a perfluoroalkyl group (hereinafter referred to as a $R^F$ group) of the formula $C_mF_{2m+1}$—, wherein m is an integer of from 4 to 20. Particularly preferred is a linear $R^f$ group wherein the average of m is from 9 to 12.

If m exceeds 20, the $R^f$ group-containing monomer is solid at room temperature, has a high sublimation property and is difficult to handle. Further, if m is less than 4, the water and oil repellency tends to be low, and the desired functions may not be obtained.

In the $R^f$ group-containing monomer, the $R^f$ group and the polymerizable unsaturated group may be bonded directly or indirectly via a connecting group, and they are preferably indirectly bonded. Particularly preferred is a compound of a structure wherein one $R^f$ group is connected to a polymerizable unsaturated group via a bivalent connecting group.

As the $R^f$ group-containing monomer, a known compound may be employed, and it can readily be synthesized from a $R^f$ group-containing alcohol, a $R^f$ group-containing carboxylic acid or a $R^f$ group-containing sulfonic acid.

The $R^f$ group-containing monomer is preferably a compound represented by the following Formula 3.

$$R^f-R^1-X \qquad \text{Formula 3}$$

In the Formula 3, $R^f$ represents the $R^f$ group, $R^f$ represents a single bond or a bivalent connecting group, and X represents a monovalent organic group having one polymerizable unsaturated group. The $R^f$ group is preferably a group disclosed in the following specific examples and Examples.

The bivalent connecting group represented by $R^f$ may be an alkylene group, an ester bond, an amide bond, an imino bond, a urethane bond, an etheric oxygen atom, a phenylene oxide group, a sulfonyl group or a connecting group containing such a structure. Specifically, it may, for example, be $-(CH_2)_{n+p}-$, $-(CH_2)_nCOONH\ (CH_2)_p-$, $-(CH_2)_nCONH(CH_2)_p-$, $-(CH_2)_nSO_2NH(CH_2)_p-$ or $-(CH_2)_nNHCONH(CH_2)_p-$. Here, each of n and p is an integer of at least 0, and n+p is an integer of from 2 to 22.

$R^1$ is preferably $-(CH_2)_{n+p}-$, $-(CH_2)_nCONH(CH_2)_p-$ or $-(CH_2)_nSO_2NH(CH_2)_p-$, wherein p is an integer of at least 2, and n+p is from 2 to 6. Particularly preferred is $-(CH_2)_{n+p}-$, wherein n+p is from 2 to 6, i.e. a dimethylene group, a trimethylene group, a tetramethylene group, a pentamethylene group or a hexamethylene group.

X is preferably, for example, a residue of an olefin such as $-CR=CH_2$, a residue of a vinyl ether such as $-OCR=CH_2$, a residue of a vinyl ester such as $-COOCR=CH_2$, a residue of a (meth)acrylate such as $-OCOCR=CH_2$, or a residue of a styrene such as $-Pn-CH=CH_2$, $-O-Pn-CH=CH_2$ or $-OCH_2-Pn-CR=CH_2$. Here, R is a hydrogen atom, a methyl group or a halogen atom, and Pn is an o-phenylene group, a m-phenylene group or a p-phenylene group.

Further, in this specification, an acrylate and a methacrylate are generally represented by a (meth)acrylate, and the same applies with respect to a representation such as a (meth)acrylamide.

X is preferably a residue of a (meth)acrylate, particularly preferably $-OCOCR=CH_2$ wherein R is a hydrogen atom or a methyl group, i.e. a (meth)acryloxy group.

Such $R^f$ group-containing monomers may be used alone or in combination as a mixture of two or more having different carbon numbers in the respective $R^f$ groups. In a usual case, at least two $R^f$ group-containing monomers having different carbon numbers in the respective $R^f$ groups, are used in combination. Specific examples of the $R^f$ group-containing monomer in the present invention will be given below, but the present invention is not limited thereto. Here, Pn is an o-phenylene group, a m-phenylene group or a p-phenylene group.

F (C $F_2)_{10}(CH_2)_2$ OCOCH=$CH_2$,
F (C $F_2)_{10}(CH_2)_3$OCOCH=$CH_2$,
F (C $F_2)_{10}(CH_2)_2$OCOC $(CH_3)$=$CH_2$,
F (C $F_2)_{10}(CH_2)_{11}$OCOCH=$CH_2$,
F (C $F_2)_{10}(C\ F_2)_2(CH_2)_2$OCOC H=$CH_2$,
F (C $F_2)_{10}CH_2$COOCH=$CH_2$,
F (C $F_2)_{10}(CH_2)_2$COOCH=$CH_2$,
F (C $F_2)_{10}$CONH $(CH_2)_2$CH=$CH_2$,
F (C $F_2)_{10}$CONH $(CH_2)_5$OCOCH=$CHH_2$,
(C $F_3)_2$CF (C $F_2)_G$ $(CH_2)_2$OCOCH=$CH_2$,
C 1 $(CF_2)_{10}(CH_2)_3$OCOCH=$CH_2$,
H $(CF_2)_{10}(CH_2)_2$OCOCH=$CH_2$,
H $(CF_2)_{10}$CH=$CH_2$,
F (C $F_2)_8(CH_2)_2$OCH=$CH_2$,
F $(CF_2)_8CH_2CF_2(CH_2)_2$OCOCH=$CH_2$,
F $(CF_2)_8(CH_2)_4$OCOCH=$CH_2$,
F $(CF_2)_8$CONH $(CH_2)_3$CH=$CH_2$,
F (C $F_2)_8(CH_2)_2$OCH$_2$PnCH=$CH_2$,
F $(CF_2)_8(CH_2)_2$OCH$_2$Pn $(CH_2)_2$OCOCH=$CH_2$,
F $(CF_2)_8SO_2N\ (C_3H_7)\ (CH_2)_2$OCOCH=$CH_2$,
F $(CF_2)_4SO_2$NH $(CH_2)_2$CH=$CH_2$,
F (C $F_2)_{14}(CH_2)_6$OCOC $(CH_3)$=$CH_2$.

As the $R^f$ group-containing monomer, a $R^f$ group-containing (meth)acrylate, a $R^f$ group-containing styrene, a $R^f$ group-containing vinyl ester or a $R^f$ group-containing fumarate is, for example, preferred. A $R^f$ group-containing (meth)acrylate is particularly preferred from the viewpoint of the polymerizability with other monomers, the flexibility of the coating film formed on fibers, the bonding property to e.g. a fiber product, a wide application, the solubility in a solvent and efficiency in emulsion polymerization.

For the development of the water and oil repellency, the proportion of the polymer units a in Polymer A is preferably within a range of from 50 to 99 wt %, particularly preferably from 55 to 98 wt %.

Polymer A may be one composed solely of the above polymer units a, but it may contain, other than polymer units a, polymer units (hereinafter referred to as polymer units c) of a polymerizable monomer (hereinafter referred to as a copolymerizable monomer) having at least one polymerizable unsaturated group and containing no $R^f$ group.

The copolymerizable monomer is not particularly limited, so long as it is a compound which is copolymerizable with the above-mentioned $R^f$ group-containing monomer and which has at least one polymerizable unsaturated group and contains no $R^f$ group. Such copolymerizable monomers may be used alone or in combination as a mixture of two or more of them in an optional ratio.

The copolymerizable monomer having one polymerizable unsaturated group may, for example, be a (meth)acrylate, a (meth)acrylamide, a vinyl ether, a vinyl ester, a fumarate or a maleate. Such a copolymerizable monomer preferably has an aliphatic hydrocarbon group or a benzene ring, and it particularly preferably has an aliphatic hydrocarbon group. Further, vinyl chloride, ethylene, vinylidene chloride, vinyl fluoride, vinylidene fluoride, chlorotrifluoroethylene or styrene, may also be preferred. For paper, vinylidene chloride is particularly preferred.

When the copolymerizable monomer has an aliphatic hydrocarbon group, the aliphatic hydrocarbon group is preferably a long chain aliphatic hydrocarbon group, more preferably one having at least 8 carbon atoms, particularly preferably one having from 8 to 24 carbon atoms. The aliphatic hydrocarbon group may be of a linear or branched structure or of a structure having a ring, but preferred is of a linear structure. As a linear aliphatic hydrocarbon group, a saturated alkyl group is preferred. When a monomer having a long chain aliphatic hydrocarbon group is used as the copolymerizable monomer, a copolymerizable monomer having a short chain aliphatic hydrocarbon group wherein the carbon number of the aliphatic hydrocarbon group is from about 1 to 7, can be used in combination. However, the copolymerizable monomer having a short chain aliphatic hydrocarbon group tends to lower the water repellency and can not be incorporated in a high proportion.

Use of the copolymerizable monomer having a linear saturated hydrocarbon group wherein the carbon number is from 8 to 24, provides a substantial effect of making the hand and feel of the treated cloth to be soft and a substantial effect of improving the performance against abrasion. Further, the copolymerizable monomer having a saturated cyclic hydrocarbon group wherein the carbon number is from 5 to 10, is also preferred, as it improves the durability against abrasion.

As the copolymerizable monomer having a long chain aliphatic hydrocarbon group, a (meth)acrylate having a linear monovalent aliphatic hydrocarbon group wherein the carbon number is from 14 to 20, is preferred.

As the copolymerizable monomer having a benzene ring, a (meth)acrylate having a benzene ring is preferred. Specifically, phenyl (meth)acrylate or benzyl (meth)acrylate is, for example, preferred. Further, the benzene ring may have a substituent, such as an alkyl group such as a methyl group or an ethyl group, or a halogen atom.

The copolymerizable monomer may contain a reactive monomer having a reactive group in its molecule. Such a reactive group may, for example, be an epoxy group, a halogen atom, a hydroxyl group, a carbamoyl group, an amino group, a blocked isocyanate group, an alkoxy silyl group, a hydroxymethylamino group, an alkoxymethylamino group or an imino group. The reactive monomer improves the bonding property to the fiber surface at the time of treating fibers, to prevent detachment of the water and oil repellent during washing or dry cleaning.

The polymerizable unsaturated groups in the copolymerizable monomer having at least two polymerizable unsaturated groups, are preferably unsaturated groups in the above-mentioned X.

The copolymerizable monomer having at least two polymerizable unsaturated groups, may, for example, be preferably an α, ω-diolefin, a divinyl benzene, a divinyl ether or a (meth)acrylate of a polyhydric alcohol. Particularly preferred is a divinyl benzene or a (meth)acrylate of a polyhydric alcohol, from the viewpoint of the copolymerizability with the $R^f$ group-containing monomer.

The polyhydric alcohol for forming the (meth)acrylate, may, for example, be ethylene glycol, propylene glycol, a butane diol, a pentane diol, neopentyl glycol, a hexane diol, a nonane diol, a benzene dimethanol, bisphenol A, trimethylolpropane, glycerol, pentaerythritol, dipentaerythritol, dimethylolcyclohexane, or modified products of such alcohols. Further, a high molecular polyhydric alcohol obtained by ring-opening polymerization of ethylene oxide and/or propylene oxide with an optional initiator, may also be mentioned.

The proportion of polymer units c in Polymer A is preferably from 0 to 50 wt %, particularly preferably from 5 to 40 wt %. In a case where this copolymerizable monomer has a short chain aliphatic hydrocarbon group of at most 11 carbon atoms, the proportion of polymer units c in Polymer A is preferably at most 20 wt %. Further, in a case where the copolymerizable monomer has at least two polymerizable unsaturated groups, the content of polymer units c is preferably at most 10 wt % in Polymer A.

It is preferred that Polymer A is present in the form of particles in the medium. The average particle size is preferably from 10 to 1,000 nm, more preferably from 10 to 300 nm, especially preferably from 10 to 200 nm. If the average particle size is less than 10 µm, a large amount of a surfactant will be required in order to obtain a suitable dispersion, whereby the water and oil repellency tends to be low, and color fading tends to result when a dyed cloth is treated. If the average particle size exceeds 1,000 nm, the particles will sediment in the medium.

The average particle size can be measured by a dynamic light scattering apparatus, an electron microscope or the like. In a case where polymerization is carried out in the presence of a surfactant by a usual emulsion polymerization method as described hereinafter, the average particle size will be contained within the above range.

Further, the water dispersion type water and oil repellent composition of the present invention contains at least one type of Compound B.

Each Compound B is a compound containing at least one triple bond and at least one hydroxyl group in its structure. Further, it is a compound containing a polyoxyalkylene moiety as a partial structure. As the polyoxyalkylene moiety, a polyoxyethylene, a polyoxypropylene, a random addition structure of a polyoxyethylene and a polyoxypropylene, or a block addition structure of a polyoxyethylene and a polyoxypropylene, may, for example, be mentioned. Compound B is a compound having a surface activity.

The amount of Compound B is preferably from 0.01 to 10 wt %, particularly preferably from 0.01 to 5 wt %, relative to Compound A.

As a preferred specific example of Compound B, an alcohol represented by the following Formula 1 or 2, or an alkylene oxide adduct of such an alcohol, may be mentioned.

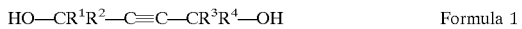
HO—CR$^1$R$^2$—C≡C—CR$^3$R$^4$—OH    Formula 1

HO—CR$^5$R$^6$—CR≡C—H    Formula 2

Here, each of $R^1$, $R^2$, $R^3$, $R^4$, $R^5$ and $R^6$ which may be the same or different from one another, is a hydrogen atom or an alkyl group. The alkyl group is preferably a linear or branched alkyl group having a carbon number of from 1 to 12, particularly preferably a linear or branched alkyl group having a carbon number of from 6 to 12. For example, a methyl group, an ethyl group, a propyl group, a butyl group or an isobutyl group, may be mentioned.

Further, as the alkylene oxide, an alkylene oxide having a carbon number of from 2 to 20, such as ethylene oxide or propylene oxide, is preferred, and the addition number of alkylene oxide is preferably from 1 to 50.

As a more preferred specific example of Compound B, the following Compound B1, Compound B2, Compound B3 or Compound B4 may be mentioned. Each of x and y is an integer of at least 0, and Compound B may be composed of one type or two or more types.

Compound B1: one having the following Formula 4 wherein the sum of x and y is 10.

Compound B2: one having the following Formula 4 wherein x is 0, and y is 0.

Compound B3: one having the following Formula 4, wherein the average of the sum of x and y is 1.3.

Compound B4: one having the following Formula 4 wherein the average of the sum of x and y is 30.

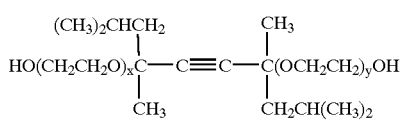

Formula 4

The water and oil repellent composition of the present invention may contain a surfactant other than Compound B ("a surfactant other than Compound B" will be hereinafter referred to as "Surfactant C"). As Surfactant C, at least one member of surfactants of non ionic type, cationic type, anionic type and amphoteric type will be employed. The amount of Surfactant C is preferably from 0.5 to 20 wt %, particularly preferably from 1 to 10 wt %, relative to the polymer units a, from the viewpoint of the water and oil repellency and the dispersion stability.

Specific examples of Surfactant C will be given below, but it is not limited thereto. Further, in the following examples of Surfactant C, the alkyl group moiety such as an octadecyl group, may be an alkenyl group moiety such an oleyl group.

The nonionic surfactant may, for example, be an alkylphenylpolyoxyethylene, an alkylpolyoxyethylene, an alkylpolyoxyalkylenepolyoxyethylene, a fatty acid ester, an alkylamineoxyethylene adduct, an alkanoic acid amideoxyethylene adduct, an alkylamineoxyethyleneoxypropylene adduct, or an alkylamineoxide.

The alkylphenylpolyoxyethylene may, for example, be nonylphenylpolyoxyethylene or octylphenylpolyoxyethylene.

The alkyl moiety of the alkylpolyoxyethylene may be a saturated aliphatic group having a carbon number of from 4 to 26, which is linear or branched. Specifically, an octyl group, a dodecyl group, a tetradecyl group, a hexadecyl group, an octadecyl group, a behenyl group or a secondary alkyl group, may, for example, be mentioned.

The alkylpolyoxyalkylenepolyoxyethylene may, for example, be an alkylpolyoxypropylenepolyoxyethylene or an alkylpolyoxybutylenepolyoxyethylene, wherein the alkyl moiety may be the same as the above-mentioned alkyl moiety.

The cationic surfactant may, for example, be an amine salt, a quaternary ammonium salt or an oxyetylene addition-type ammonium salt. Specifically, it may, for example, be an alkyldimethylamine hydrochloride, a dialkylmethylamine hydrochloride, an alkyltrimethylammonium chloride, a dialkyldimethylammonium chloride, a monoalkylamineacetate, or an alkylmethyldipolyoxyethyleneammonium chloride. The alkyl moiety may be the same as the above-mentioned alkyl moiety.

The anionic surfactant may, for example, be a fatty acid salt, an α-olefin sulfonate, an alkylbenzene sulfonic acid and its salt, an alkyl sulfate, an alkylether sulfate, an alkylphenylether sulfate, an N-acylmethyltaurine salt or an alkyl sulfosuccinate.

The amphoteric surfactant may, for example, be an alanine, an imidazolinium betaine, an amide betaine, or betaine acetate. Specifically, it may, for example, be lauryl betaine, stearyl betaine, laurylcarboxymethylhydroxyethylimidazolinium betaine, betaine lauryldimethylamino acetate or betaine fatty acid amide propyldimethylamino acetate.

When Surfactant C other than Compound B is contained, it is preferred that Compound B is contained in an amount of from 1 to 100 wt %, particularly preferably from 5 to 50 wt %, based on the total amount of Compound B and Surfactant C.

The method for producing Polymer A of the present invention is not particularly limited, and it is preferred to polymerize the $R^f$ group-containing monomer in the presence of Compound B in an aqueous medium by a known method such as an emulsion polymerization method or a dispersion polymerization method. In a case where polymerization is carried out by an emulsion polymerization method or a dispersion polymerization method, a method may, for example, be mentioned wherein the polymerization is carried out by an addition of a polymerization initiator in the presence of a surfactant and a polymerization medium.

The polymerization medium is preferably an aqueous medium containing water, and an organic solvent may be incorporated in the aqueous medium if required. As the organic solvent, a water-soluble organic solvent is preferred, and an organic solvent of ester type, ketone type or ether type is preferred. The ratio of water to the organic solvent is not particularly limited.

Specific examples of the organic solvent may be acetone, ethylene glycol monoethyl ether monoacetate, ethylene glycol monoethyl ether, ethylene glycol monomethyl ether, ethylene glycol monobutyl ether, propylene glycol monomethyl ether, propylene glycol monomethyl ether monoacetate, dipropylene glycol monomethyl ether, tripropylene glycol monomethyl ether, propylene glycol dibutyl ether, ethyl 3-ethoxypropione, 3-methoxy-3-methyl-1-butanol, 2-t-butoxyethanol, isopropylalcohol, n-butylalcohol, isobutylalcohol, ethyl alcohol, ethylene glycol, propylene glycol, dipropylene glycol and tripropylene glycol.

As the polymerization initiator, a water-soluble or oil-soluble polymerization initiator is preferred, and a commonly used initiator of azo type, peroxide type or redox type may be employed depending upon the polymerization temperature. As the polymerization initiator, a water-soluble initiator is preferred, and particularly preferred is a salt of an azo compound.

The polymerization temperature is not particularly limited, but it is preferably from 20 to 150° C.

Further, in the polymerization reaction of a monomer, for the purpose of controlling the molecular weight, a chain transfer agent may be incorporated. As such a chain transfer agent, an aromatic compound or a mercaptan is preferred, and particularly preferred is an alkyl mercaptan. As a specific example of the chain transfer agent, n-octylmercaptan, n-dodecylmercaptan, t-dodecylmercaptan, octadecylmercaptan or a -methylstyrene [dimmer] dimer $CH_2$=$CPhCH_2C$ $(CH_3)_2Ph$ (wherein Ph is a phenyl group) may preferably be mentioned.

As a stage prior to initiation of the polymerization, a mixture comprising the monomer, the surfactant and the aqueous medium, may preliminarily be dispersed by e.g. a homomixer or a high pressure emulsifying machine. By thorough dispersion prior to the initiation of the polymerization, it is possible to improve the yield of the finally obtainable polymer.

It is possible to employ a method of adding the surfactant during the emulsion polymerization and/or a method of adding it after the emulsion polymerization. Namely, Compound B may be present during the emulsion polymerization or may be added during the preparation of a latex stock solution.

The water dispersion type water and oil repellent composition of the present invention is a composition having Polymer A dispersed in an aqueous medium. Such a composition may be prepared by dispersing Polymer A in a desired aqueous solvent. However, usually, by using the desired medium as a polymerization medium in the polymerization reaction, it is possible to prepare a water dispersion type water and oil repellent composition spontaneously. As the aqueous medium, water or a medium comprising water and an organic solvent, is preferred. The amount of the organic solvent to be used, is preferably from about 0 to 40 wt % relative to Polymer A.

The amount of Polymer A is preferably at a concentration of from 1 to 50 wt % relative to the aqueous medium, but the concentration may optionally be changed depending upon the particular purpose or the formulation of the composition.

The water dispersion type water and oil repellent composition of the present invention may be applied to an object to be treated by an optional method depending upon the type of the object to be treated or the formulation of the composition. For example, for a fiber product or paper, a method may be employed wherein it is applied to the surface of the object to be treated by a coating method such as dip coating, followed by drying.

Further, to the water dispersion type water and oil repellent composition of the present invention, other additive components, such as other water repellents, oil repellents, insecticides, flame retardants, antistatic agents, anticrease agents, or in the case where the composition is used for paper, suitable sizing agents, may, optionally be incorporated.

The object to be treated with the water dispersion type water and oil repellent composition of the present invention may, for example, be a fiber product made of e.g. a natural fiber, a synthetic fiber on mixed fibers thereof, and it may also be an article made of a metal, glass or resin, which is required to have durability of water and oil repellency.

The mechanism as to why the object treated with the water dispersion type water and oil repellent composition of the present invention has water and oil repellency and water resistance excellent in durability, is not clearly understood, but it is considered to be such that by the use of Polymer A and Compound B, a more uniform coating film is formed on the surface and/or the interior of the fibers of the fabric.

EXAMPLES

Examples 1 to 5 are Examples for preparation of dispersions of Polymer A, Examples 6 to 10 and 16 to 20 are Working Examples of the present invention, and Examples 11 to 15 are Comparative Examples.

Example 1

Into a 1 l glass reactor equipped with a stirrer, as polymerizable monomers, 168 g (70 parts) of a perfluoroalkylethyl acrylate ($C_mF_{2m+1}CH_2CH_2OCOCH=CH_2$, a mixture of those wherein m is 6, 8, 10, 12, 14 and 16, and the average of m is 9, and this will be hereinafter referred to as FA), 15.5 g (6.5 parts) of dioctyl maleate, 6.0 g (2.5 parts) of N-methylolacrylamide and 0.5 g of n-dodecylmercaptan, as surfactants, 12.0 g of nonylphenylpolyoxyethylene and 2.4 g of an alkyltrimethylammonium chloride (of the formula $RN^+ (CH_3)_3 \cdot Cl^-$, wherein R is a $C_{16-18}$ alkyl group), 3.6 g of hexadecylpolyoxyethylene, 418 g of deionized water and 71.7 g of dipropylene glycol were charged and preliminarily dispersed at 40° C. for 30 minutes and then treated by a high pressure homogenizer (emulsifying machine, manufactured by Manton-Gaulin Company) under a pressure of 200 kg/cm², to obtain an emulsion.

This emulsion was put into a 1 l stainless steel autoclave, followed by replacement with nitrogen. Then, 50.2 g (21 parts) of a vinyl chloride monomer was added thereto, and then 2.4 g of VA-046B (azo type initiator, manufactured by Wako Jyunyaku K.K.) was added thereto. The temperature was raised to 50° C., followed by polymerization for 15 hours to obtain a water dispersion (A1) (730 g) having a solid content of 32 wt % and an average particle size of 105 nm.

Further, the measurement of the average particle size was carried out by a dynamic laser scattering (DLS) method (ELS-800, manufactured by Otsuka Denshi K.K.)

Example 2

Into a 1 l glass reactor equipped with a stirrer, as polymerizable monomers, 167 g (70 parts) of FA, 15.5 g (6.5 parts) of dioctyl maleate, 5.9 g (2.5 parts) of N-methylolacrylamide, and 0.5 g of n-dodecylmercaptan, as surfactants, 11.9 g of nonylphenylpolyoxyethylene and 2.4 g of an alkyltrimethylammonium chloride (of the formula $RN^+ (CH_3)_3 \cdot Cl^-$, wherein R is a $C_{16-18}$ alkyl group), 3.6 g of Compound B1 (surfynol 465, trade name, sold by Nisshin Kagaku Kogyo K.K.), 418 g of deionized water and 71.7 g of dipropylene glycol, were charged and preliminarily dispersed at 40° C. for 30 minutes and then treated by a high pressure homogenizer (emulsifying machine, manufactured by Manton-Gaulin Company) under 200 kg/cm², to obtain an emulsion.

This emulsion was put into a 1 l stainless steel autoclave, followed by substitution with nitrogen. Then, 50.2 g (21 parts) of a vinyl chloride monomer was added thereto, and 2.4 g of VA-046B (azo type initiator, manufactured by Wako Jyunyaku K.K.) was added thereto. The temperature was raised to 50° C., followed by polymerization for 15 hours to obtain a water dispersion (A2) (730 g) having a solid content of 33% and an average particle size of 110 nm. Water dispersion (A2) contains Compound B1.

Example 3

Into a 1 l glass reactor equipped with a stirrer, as polymerizable monomers, 168 g (70 parts) of FA, 15.6 g (6.5 parts) of dioctyl maleate, 6.0 g (2.5 parts) of N-methylolacrylamide, and 0.5 g of n-dodecylmercaptan, as surfactants, 12.0 g of nonylphenylpolyoxyethylene and 2.4 g of an alkyltrimethylammonium chloride (of the formula $RN^+ (CH_3)_3 \cdot Cl^-$, wherein R is a $C_{16-18}$ alkyl group), 481 g of deionized water, and 12.0 g of dipropylene glycol, were charged and preliminarily dispersed at 40° C. for 30 minutes, and then treated by a high pressure homogenizer (emulsifying machine, manufactured by Manton-Gaulin Company) under 200 kg/cm², to obtain an emulsion.

This emulsion was put into a 1 l stainless steel autoclave, followed by substitution with nitrogen. Then, 50.4 g (21 parts) of a vinyl chloride monomer was added thereto, and then 2.4 g of VA-046B (azo type initiator, manufactured by Wako Jyunyaku K.K.) was added thereto. The temperature was raised to 50° C., followed by polymerization for 15 hours to obtain an aqueous dispersion (A3) (730 g) having a solid content of 32% and an average particle size of 242 nm.

Example 4

Into a 1 l glass reactor equipped with a stirrer, as polymerizable monomers, 144 g (60 parts) of FA, 12 g (5 parts) of acrylamide, and 12 g (5 parts) of ethyl acrylate, as a surfactant, 14.4 g of polyoxyethylenehexadecyl ether, 418 g of deionized water, and 71.7 g of dipropylene glycol, were charged and preliminarily dispersed at 40° C. for 30 minutes, and then treated by a high pressure homogenizer (emulsifying machine, manufactured by Manton-Gaulin Company) under 200 kg/cm$_2$, to obtain an emulsion.

This emulsion was put into a 1 l stainless steel autoclave, followed by substitution with nitrogen. Then, 72 g (30 parts) of a vinylidene chloride was added thereto, followed by polymerization for 8 hours to obtain a water dispersion (A4) (730 g) having a solid content of 30 wt % and an average particle size of 105 nm.

Example 5

Into a 1 l glass reactor equipped with a stirrer, as polymerizable monomers, 144 g (60 parts) of FA, 12 g (5 parts) of acrylamide, and 12 g (5 parts) of ethyl acrylate, as surfactants, 14.4 g of polyoxyethylenehexadecyl ether and 3.6 g of Compound B1 (surfynol 465, trade name, sold by Nisshin Kagaku Kogyo K.K.), 418 g of deionized water, and 71.7 g of dipropylene glycol, were charged and preliminarily dispersed at 40° C. for 30 minutes, and then treated by a high pressure homogenizer (emulsifying machine, manufactured by Manton-Gaulin Company) under 200 kg/cm to obtain an emulsion.

This emulsion was put into a 1 l stainless steel autoclave, followed by substitution with nitrogen. Then, 72 g (30 parts) of vinylidene chloride was added thereto, followed by polymerization for 8 hours to obtain a water dispersion (A5). (730 g) having a solid content of 30 wt % and an average particle size of 105 nm. The water dispersion (A5) contains Compound B1.

Examples 6 to 20

Compound B2 was added to the water dispersion (A1) so that the solid content concentration would be 20 wt %, and the concentration of Compound B2 would be 1.0 wt %, to obtain a latex stock solution (A1-2). In the same manner, latex stock solutions as identified in Table 1 were prepared. In Table 1, what is in the brackets represents Compound B present in the water dispersion (A2) or (A5).

TABLE 1

| Example No. | Latex stock solution | Water dispersion | Compound B |
|---|---|---|---|
| 6 | A1-2 | A1 | B2 |
| 7 | A1-3 | A1 | B3 |
| 8 | A2-1 | A2 | Nil (B1) |
| 9 | A2-2 | A2 | B2 (B1) |
| 10 | A2-3 | A2 | B3 (B1) |
| 11 | A3-2 | A3 | B2 |
| 12 | A3-3 | A3 | B3 |
| 13 | A1-1 | A1 | Nil |
| 14 | A3-1 | A3 | Nil |
| 15 | A4-1 | A4 | Nil |
| 16 | A4-2 | A4 | B2 |
| 17 | A4-3 | A4 | B3 |
| 18 | A5-1 | A5 | Nil (B1) |
| 19 | A5-2 | A5 | B2 (B1) |
| 20 | A5-3 | A5 | B3 (B1) |

With respect to latexes of Examples 6 to 14, 141.5 g of deionized water, 0.5 g of a melamine resin (Sumitex Resin M3, trade name, manufactured by Sumitomo Chemical Co. Ltd.) and 0.5 g of a catalyst (Sumitex Accelerator ACX, trade name, manufactured by Sumitomo Chemical Co., Ltd.) were added to 7.5 g of a latex stock solution to obtain a latex treating solution.

As test cloths, nylon taffeta cloth and very fine fiber high density polyester taffeta were used. After dipping in a latex treating solution, the cloths were squeezed between two rubber rollers to bring a wet pick up to a level of 60 wt % in the case of the nylon taffeta and to a level of 65 wt % in the case of the very fine fiber high density polyester taffeta. Then, they were dried at 110° C. for 90 seconds and further subjected to heat treatment at 170° C. for 60 seconds. The obtained test cloths were evaluated by the following methods.

Further, with respect to the durability test (represented by HL20) of the test cloth, washing was repeated 20 times by a water washing method as described in separate Table 103 of JIS L0217, followed by drying in air, whereupon the performance evaluation was carried out. The results are shown in Table 4.

With respect to latexes of Examples 15 to 20, they were diluted with water to prepare treating baths having a solid content concentration of 0.5 wt %, and using a sizing press, non-sized paper (weight: 50 g/m$^2$) was subjected to impregnation treatment at a rate where the drawing rate would be 50%. Then, it was dried for 15 seconds by a drum dryer heated to 80° C. The results are shown in Table 5.

Evaluation of Water Repellency

The evaluation was carried out by the spray test of JIS L1092, and represented by the water repellency grade as shown in Table 1. The usual shower water temperature was 27° C. Further, a water repellency grade identified with +(−) indicates that the respective evaluation is better (worse).

TABLE 2

| Water repellency grade | State |
|---|---|
| 100 | No wetting observed on the surface |
| 90 | Slight wetting observed on the surface |
| 80 | Partial wetting observed on the surface |
| 70 | Substantial wetting observed on the surface |
| 50 | Wetting observed over the entire surface |
| 0 | Complete wetting observed over both surfaces |

Evaluation of Water Resistance

The evaluation was carried out by (a) hydrostatic pressure method under method A for water resistance (low hydraulic pressure method) in accordance with JIS L1092. Unit: mm.

Evaluation of Oil Repellency

The evaluation was carried out in accordance with a 3M kit test method employing a mixed oil (volume%) as identified in Table 3 and represented by the oil repellency grade as shown in Table 3.

TABLE 3

| Kit No. | Castor oil | Toluene | n-Heptane |
|---|---|---|---|
| 1 | 100 | 0 | 0 |
| 2 | 90 | 5 | 5 |
| 3 | 80 | 10 | 10 |
| 4 | 70 | 15 | 15 |
| 5 | 60 | 20 | 20 |
| 6 | 50 | 25 | 25 |
| 7 | 40 | 30 | 30 |

TABLE 3-continued

| Kit No. | Castor oil | Toluene | n-Heptane |
|---|---|---|---|
| 8 | 30 | 35 | 35 |
| 9 | 20 | 40 | 40 |
| 10 | 10 | 45 | 45 |
| 11 | 0 | 50 | 50 |
| 12 | 0 | 45 | 55 |

Evaluation of Abrasion Resistance

A latex treating solution was prepared as follows.

To 10 g of a latex stock solution, 140 g of deionized water and 0.5 g of a melamine resin (Sumitec Accelarator ACX, trade name, manufactured by Sumitomo Chemical Co., Ltd.) were added to prepare a latex treating solution. As a test cloth, a nylon spun cloth (dyed and fixed) was used. After dipping in the latex treating agent, the cloth was squeezed between two rubber rollers to bring a wet pick up to 60%. Then, it was dried at 110° C. for 90 seconds, and further subjected to heat treatment at 170° C. for 60 seconds. The obtained test cloth was evaluated by the following method in accordance with the method described in "Dying Industry" 46, 4, p167 (1997).

Using a shifer-type wear abrasion tester SAT-250, manufactured by Daiei Kagaku Seiki K.K. (JIS L1018 method A uniform method), the same test cloth was attached to each of a test holder and an abrader holder. One droplet of deionized water was put on the test cloth on the test holder side by means of a pipette, and the abrader holder was descended and abrasion was carried out 100 times. This abrasion operation was repeated five times to carry out a total of 500 times of abrasion. The abrading conditions were as follows.

Pressing load: 22.3 N,

Tensile load: 22.2 N,

Rotational speed (test holder): 242 rpm,

Rotational speed (abrader holder): 250 rpm.

After the abrasion, the test cloth on the abrader holder side was taken out, and washing was repeated 20 times by a water washing method of separate Table 103 of JIS L0217, followed by drying in air, whereupon the water repellency was evaluated.

TABLE 4

| Ex. | Nylon taffeta | | | | Polyester taffeta | | | | Nylon spun |
|---|---|---|---|---|---|---|---|---|---|
| | Water repellency | | Water resistance | | Water repellency | | Water resistance | | Abrasion resistance |
| | Initial stage | HL 20 | Initial stage | HL 20 | Initial stage | HL 20 | Initial stage | HL 20 | HL 20 Water repellency |
| 6 | 100 | 90 | 420 | 330 | 100 | 90 | 450 | 350 | 80+ |
| 7 | 100 | 90 | 430 | 350 | 100 | 90 | 460 | 350 | 80+ |
| 8 | 100 | 90 | 420 | 350 | 100 | 80+ | 460 | 360 | 80+ |
| 9 | 100 | 100− | 450 | 360 | 100 | 90+ | 470 | 370 | 90 |
| 10 | 100 | 100− | 450 | 350 | 100 | 90 | 480 | 370 | 90− |
| 11 | 100 | 80+ | 370 | 260 | 100 | 80 | 390 | 280 | 70+ |
| 12 | 100 | 80+ | 380 | 260 | 100 | 80 | 400 | 280 | 70+ |
| 13 | 100 | 90− | 380 | 290 | 100 | 80+ | 400 | 290 | 70 |
| 14 | 100 | 80 | 350 | 250 | 100 | 70 | 380 | 260 | 70 |

TABLE 5

| Ex. | Oil repellency |
|---|---|
| 15 | 6 |
| 16 | 9 |
| 17 | 9 |
| 18 | 10 |
| 19 | 11 |
| 20 | 12 |

What is claimed is:

1. The aqueous dispersion according to claim 1, wherein said monomer having a polyfluoroalkyl group and a polymerizable unsaturated group is copolymerized with a (meth)acrylate, a (meth)acrylamide, a vinyl ether, a vinyl ester, a fumarate or a maleate.

2. The aqueous dispersion according to claim 1, wherein compound B is an alkylene oxide adduct of a monool or polyol having an unsaturated triple bond.

3. The aqueous dispersion according to claim 1, wherein the monool or polyol having an unsaturated triple bond has formula IV:

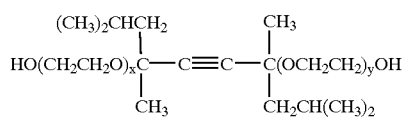

Formula 4 wherein (i) the sum of x and y is 10;

(ii) both x and y are 0;

(iii) the average of the sum of x and y is 1.3; or (iv) the average of the sum of x and y is 30.

4. The aqueous dispersion according to claim 1, wherein said monool or polyol having an unsaturated triple bond is a compound of Formula I or II as follows:

Formula 1

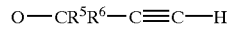

Formula 2 wherein each of $R^1$ to $R^6$ is hydrogen or alkyl.

5. The aqueous dispersion according to claim 1, wherein the average particle size of particles of polymer A ranges from 10 to 200 nm.

6. The aqueous dispersion according to claim 1, wherein the polyfluoroalkyl group of polymer A has the formula $C_mF_{2m+1}$—wherein m is an integer ranging from 4 to 20.

7. An aqueous dispersion of a water and oil repellant composition, consisting essentially of:
   an aqueous medium and
   Polymer A: a polymer comprising monomer units a of a monomer having a polyfluoroalkyl group and a polymerizable unsaturated group; and
   a surface active combination consisting of at least one Compound B which is a monool or a polyol having an unsaturated triple bond, or an alkylene oxide adduct thereof, in an amount ranging from 0.0 1 to 5.0 wt % relative to the amount of Polymer A, and a Surfactant C which is at least one surfactant selected from the group consisting of nonionic surfactants selected from the group consisting of an alkylphenylpolyoxyethylene, an alkylpolyoxyethylene, an alkylpolyoxyalkylenepolyoxyethylene, a fatty acid ester, an alkylamineoxyethylene adduct, an alkanoic acidamideoxyethylene adduct, an alkylamineoxyethyleneoxypropylene adduct and an alkylamineoxide, a cationic surfactant selected from the group consisting of an amine salt, a quaternary ammonium salt or an oxyethylene addition-type ammonium salt, an anionic surfactant selected from the group consisting of a fatty acid salt, an α-olefin sulfonate, an alkylbenzene sulfonic acid or its salt, an alkyl sulfate, an alkylether sulfate, an alkylphenylether sulfate, an N-acylmethyltaurine salt and an alkyl sulfosuccinate and an amphoteric surfactant, in an amount ranging from 0.5 to 20 wt % relative to monomer unit a of Polymer A.

8. A method of producing an aqueous dispersion of a water and oil repellant composition according to claim 1, which comprises:
   emulsion-polymerizing a monomer having a polyfluoroalkyl group and a polymerizable unsaturated group in an aqueous medium in the presence of a monool or a polyol having an unsaturated triple bond, or an alkylene oxide adduct thereof, thereby preparing the aqueous dispersion of claim 1.

* * * * *